US012669827B2

(12) United States Patent
Miao et al.

(10) Patent No.: US 12,669,827 B2
(45) Date of Patent: Jun. 30, 2026

(54) METHOD OF VISION-BASED LONG-RANGE AND SHORT-RANGE GUIDANCE FOR AUTONOMOUS UAV LANDING

(71) Applicant: Shanghai University, Shanghai (CN)

(72) Inventors: Zhonghua Miao, Shanghai (CN); Shengjie Piao, Shanghai (CN); Nan Li, Shanghai (CN); Bo Hu, Shanghai (CN); Yunhui Li, Shanghai (CN); Chuangxin He, Shanghai (CN)

(73) Assignee: Shanghai University, Shanghai (CN)

( * ) Notice: Subject to any disclaimer, the term of this patent is extended or adjusted under 35 U.S.C. 154(b) by 141 days.

(21) Appl. No.: 18/677,331

(22) Filed: May 29, 2024

(65) Prior Publication Data

US 2024/0411316 A1 Dec. 12, 2024

(30) Foreign Application Priority Data

Jun. 7, 2023 (CN) .......................... 202310671111.4

(51) Int. Cl.
G05D 1/243 (2024.01)
G05D 1/654 (2024.01)
(Continued)

(52) U.S. Cl.
CPC ............. G05D 1/243 (2024.01); G05D 1/654 (2024.01); G06T 7/50 (2017.01); G06T 7/73 (2017.01);
(Continued)

(58) Field of Classification Search
CPC .... G05D 1/243; G05D 1/654; G05D 2109/20; G05D 2101/15; G05D 2111/10;
(Continued)

(56) References Cited

U.S. PATENT DOCUMENTS 9,056,676 B1 * 6/2015 Wang ........................ B60R 9/00
2020/0334499 A1 * 10/2020 Ma ....................... G06F 18/2413
(Continued)

FOREIGN PATENT DOCUMENTS

CN 109725645 7/2019
CN 110231835 9/2019
(Continued)

*Primary Examiner* — Scott A Browne
*Assistant Examiner* — Izcalli Rios-Aguirre
(74) *Attorney, Agent, or Firm* — Mark C. Johnson; Johnson |Dalal

(57) ABSTRACT

Provided is a method for autonomous unmanned aerial vehicle (UAV) landing, including: collecting an unmanned vehicle image dataset in advance, training an unmanned vehicle detection model by using the unmanned vehicle image dataset combined with a YOLOv5 neural network; collecting, by the UAV during a landing process, images of an area below the UAV at specified time intervals, inputting the collected images into the unmanned vehicle detection model for recognition and detection; if an unmanned vehicle is recognized, further determining position information of the unmanned vehicle, and outputting, by a control module, a long-range guidance control instruction, to instruct the UAV to fly to a specified distance position above the unmanned vehicle; collecting, by the UAV, an image of a target and determining position information of the target, and outputting, by the control module, a short-range guidance control instruction to instruct the UAV to land on an unmanned vehicle platform.

18 Claims, 7 Drawing Sheets

(51) Int. Cl.

| | |
|---|---|
| *G05D 101/15* | (2024.01) |
| *G05D 109/20* | (2024.01) |
| *G05D 111/10* | (2024.01) |
| *G06T 7/50* | (2017.01) |
| *G06T 7/73* | (2017.01) |
| *G06V 10/20* | (2022.01) |
| *G06V 10/44* | (2022.01) |
| *G06V 10/774* | (2022.01) |
| *G06V 10/82* | (2022.01) |
| *G06V 20/17* | (2022.01) |
| *G06V 20/50* | (2022.01) |
| *G06V 20/70* | (2022.01) |

(52) U.S. Cl.
CPC ............ *G06V 10/20* (2022.01); *G06V 10/774* (2022.01); *G06V 10/82* (2022.01); *G06V 20/17* (2022.01); *G06V 20/50* (2022.01); *G06V 20/70* (2022.01); *G05D 2101/15* (2024.01); *G05D 2109/20* (2024.01); *G05D 2111/10* (2024.01); *G06T 2207/10032* (2013.01); *G06V 10/44* (2022.01)

(58) Field of Classification Search
CPC ... G06T 7/50; G06T 7/73; G06T 2207/10032; G06V 20/17; G06V 20/70; G06V 10/20; G06V 10/82; G06V 20/50; G06V 10/774; G06V 10/44
See application file for complete search history.

(56) References Cited

U.S. PATENT DOCUMENTS

| | | | | |
|---|---|---|---|---|
| 2022/0121836 | A1* | 4/2022 | Dins | G06T 7/55 |
| 2022/0198703 | A1* | 6/2022 | Evans | G06T 3/40 |
| 2022/0198793 | A1* | 6/2022 | Huang | G06T 7/579 |
| 2023/0217906 | A1* | 7/2023 | Girdhar | H04B 11/00 |
| | | | | 119/215 |
| 2024/0227785 | A1* | 7/2024 | Wang | G06V 20/586 |
| 2024/0296648 | A1* | 9/2024 | Uzawa | G06V 10/82 |
| 2024/0331398 | A1* | 10/2024 | Mazumder | G06V 20/58 |

FOREIGN PATENT DOCUMENTS

| | | |
|---|---|---|
| CN | 112363515 | 1/2021 |
| CN | 114237262 | 12/2021 |
| CN | 114708489 | 4/2022 |
| CN | 115755985 | 12/2022 |

* cited by examiner

METHOD OF VISION-BASED LONG-RANGE AND SHORT-RANGE GUIDANCE FOR AUTONOMOUS UAV LANDING

CROSS REFERENCE TO RELATED APPLICATION

This patent application claims the benefit and priority of Chinese Patent Application No. 202310671111.4, filed with the China National Intellectual Property Administration on Jun. 7, 2023, the disclosure of which is incorporated by reference herein in its entirety as part of the present application.

TECHNICAL FIELD

The present disclosure relates to the technical field of unmanned aerial vehicle (UAV) landing control, and in particular, to a method of vision-based long-range and short-range guidance for autonomous UAV landing.

BACKGROUND

UAVs, with the advantages of small size, ease of use, and high reliability, were initially widely used in defense and military applications. With the rapid iteration of related technologies such as vision, UAVs have gradually been applied in civilian fields such as agriculture. However, battery-powered agricultural UAVs have limited payload and weak endurance, requiring replenishment of pesticides or battery replacement after each flight operation, greatly reducing operational efficiency. Therefore, a scheme of UAVs in cooperation with unmanned vehicles is designed, which utilizes the advantages of heavy load and long endurance of the unmanned vehicles to provide pesticide and battery support for the UAVs. Therefore, it is necessary to precisely control the autonomous landing of UAVs to improve the operational efficiency, effectively shorten the time for loading pesticides and replacing batteries, and ensure the reliable execution of all-weather tasks. This is crucial for the heterogeneous platform collaboration of UAVs and unmanned vehicles.

In the prior art, some research has been conducted on autonomous UAV landing. For example, Chinese Patent Application No. 202110674469.3 proposes a solution where a UAV flies to the airspace above the landing area using Global Position System (GPS), identifies a large quick response (QR) code on the landing area, is controlled to hover over the large QR code, and then identifies a small QR code for precise landing. This method solves the problem of low landing accuracy but has limitations in practical application due to its small visual recognition angle and short recognition distance.

Chinese Patent Application No. 201910336752.8 designs a visual recognition marker composed of an equilateral triangle and concentric circles. Position parameters of a UAV relative to the center of the recognition marker are first calculated by identifying the equilateral triangle. Then, the position deviation and yaw angle of the UAV relative to the center of the recognition marker are determined by using the concentric circles and heading reference lines therein, thereby completing the attitude adjustment and autonomous landing of the UAV. However, this method is also limited by the viewing angle and can only perform close-range recognition and detection.

In summary, traditional research on autonomous UAV landing mostly focuses on recognizing nearby fixed targets.

Limited by the size of the targets and the viewing angle of the UAV, the UAV has only a small viewing range in which targets can be accurately recognized. Current technological improvements only optimize the shape of the targets or improve recognition performance, while these approaches cannot effectively and accurately control the autonomous landing of UAVs onto unmanned vehicle platforms.

SUMMARY

An objective of the present disclosure is to provide a method of vision-based long-range and short-range guidance for autonomous UAV landing, to overcome the deficiencies of the prior art. The present disclosure not only improves positioning accuracy by designing a new target but also extends an effective landing guidance distance by designing long-range and short-range guidance, thereby enhancing the precision of autonomous UAV landing.

The objective of the present disclosure can be achieved by the following technical solution: a method of vision-based long-range and short-range guidance for autonomous UAV landing, including the following steps:

S1: collecting an unmanned vehicle image dataset in advance;

S2: training an unmanned vehicle detection model by using the unmanned vehicle image dataset combined with a YOLOv5 neural network;

S3: loading the unmanned vehicle detection model onto a control module of a UAV;

S4: collecting, by the UAV during a landing process, images of an area below the UAV at specified time intervals, and inputting the collected images into the unmanned vehicle detection model for recognition and detection;

S5: if an unmanned vehicle is recognized in the area below the UAV, determining position information of the unmanned vehicle through image analysis, and then proceeding to step S6; otherwise, returning to step S4;

S6: outputting, by the control module, a long-range guidance control instruction based on the position information of the unmanned vehicle, to instruct the UAV to fly to a specified distance position above the unmanned vehicle;

S7: capturing, by the UAV, an image of a target installed on the unmanned vehicle, and identifying position information of the target; and S8: outputting, by the control module, a short-range guidance control instruction based on the position information of the target, to instruct the UAV to land on an unmanned vehicle platform.

Further, step S2 specifically includes the following substeps:

S21: preprocessing the unmanned vehicle image dataset and dividing the unmanned vehicle image dataset into a training set and a validation set according to a preset ratio;

S22: annotating images in the training set with corresponding labels by using an annotation tool, and recording categories for cluster analysis, to build the YOLOv5 neural network; and S23: training and validating the YOLOv5 neural network based on the training set and the validation set, to obtain the UAV detection model.

Further, in step S21, the preprocessing specifically adopts Mosaic data augmentation, including but not limited to random horizontal or vertical flipping, cropping, and scale transformation operations.

Further, in step S23, before the training and validation of the YOLOv5 neural network, image sizes and resolutions are standardized: first, scaling down the images based on an input size required by the YOLOv5 neural network, and then adding black bars to shorter sides to form a square, thereby meeting input specifications of 608 pixels*608 pixels.

Further, during the training of the YOLOv5 neural network in step S23, a Generalized Intersection over Union (GIoU) loss function is specifically used to calculate a loss of a bounding box:

$$\mathrm{GIoU} = |A \cap B| \|A \cup B| - |C \backslash (A \cup B\| C| = \mathrm{IoU} - |C \backslash (A \cup B\| C|$$

That is, for any two arbitrary boxes A and B, a smallest enclosed shape C is found, where C can contain both A and B. Then, a ratio of an area of C outside A and B to a total area of C is calculated, and the ratio is subtracted from an Intersection over Union (IoU) of A and B to obtain a loss value of the bounding box.

Further, the target installed on the unmanned vehicle is a pattern including two AprilTags and an H-shaped geometric pattern, with the two AprilTags located in upper and lower grooves of the H-shaped geometric pattern.

Furthermore, the target has a size of 0.5 m*0.5 m.

Further, step S7 specifically includes the following substeps:

S71: capturing, by the UAV, an image of the target installed on the unmanned vehicle;

S72: analyzing and processing the image of the target to obtain position information of the AprilTags in the image of the target; and S73: performing coordinate system transformation on the position information of the AprilTags in the image of the target, and then obtaining Euler angles through a homography matrix, to obtain real-time positions of the AprilTags.

Furthermore, the control module of the UAV includes a recognition unit, a processing unit, and a driving unit. The recognition unit is equipped with the unmanned vehicle detection model.

The processing unit is configured to calculate distance information between the UAV and the unmanned vehicle or the target, and output a corresponding control signal to the driving unit.

The driving unit is configured to adjust a flight status of the UAV according to the control signal.

Further, the driving unit is specifically configured to adjust a flight direction, a flight altitude, a flight speed, hovering, a landing speed, and a landing altitude of the UAV.

Compared with the prior art, the present disclosure has the following advantages:

1. The present disclosure proposes a scheme of long-range and short-range guidance for UAV landing, which involves detecting and recognizing an unmanned vehicle image to guide the UAV to fly to a set distance position above the unmanned vehicle; and then recognizing and locating the target image installed on the unmanned vehicle to guide the UAV to land on the unmanned vehicle platform at short range. This greatly extends the effective distance of visual landing guidance, breaks through the limitations of visual recognition guidance in the prior art, and improves the accuracy of autonomous UAV landing.

2. The present disclosure employs the AprilTag technology to design a target pattern consisting of two AprilTags and an H-shaped geometric pattern. The AprilTag is black and white, capable of carrying multiple types of information. After the target image is captured, real-time position information of the target can be obtained through image processing and analysis, facilitating accurate positioning and recognition for the UAV during landing, reducing positioning errors, and improving the fault tolerance of autonomous UAV landing.

DETAILED DESCRIPTION OF THE EMBODIMENTS

The present disclosure will be described in detail below with reference to the drawings and specific embodiments.

EMBODIMENT

Figure 1:
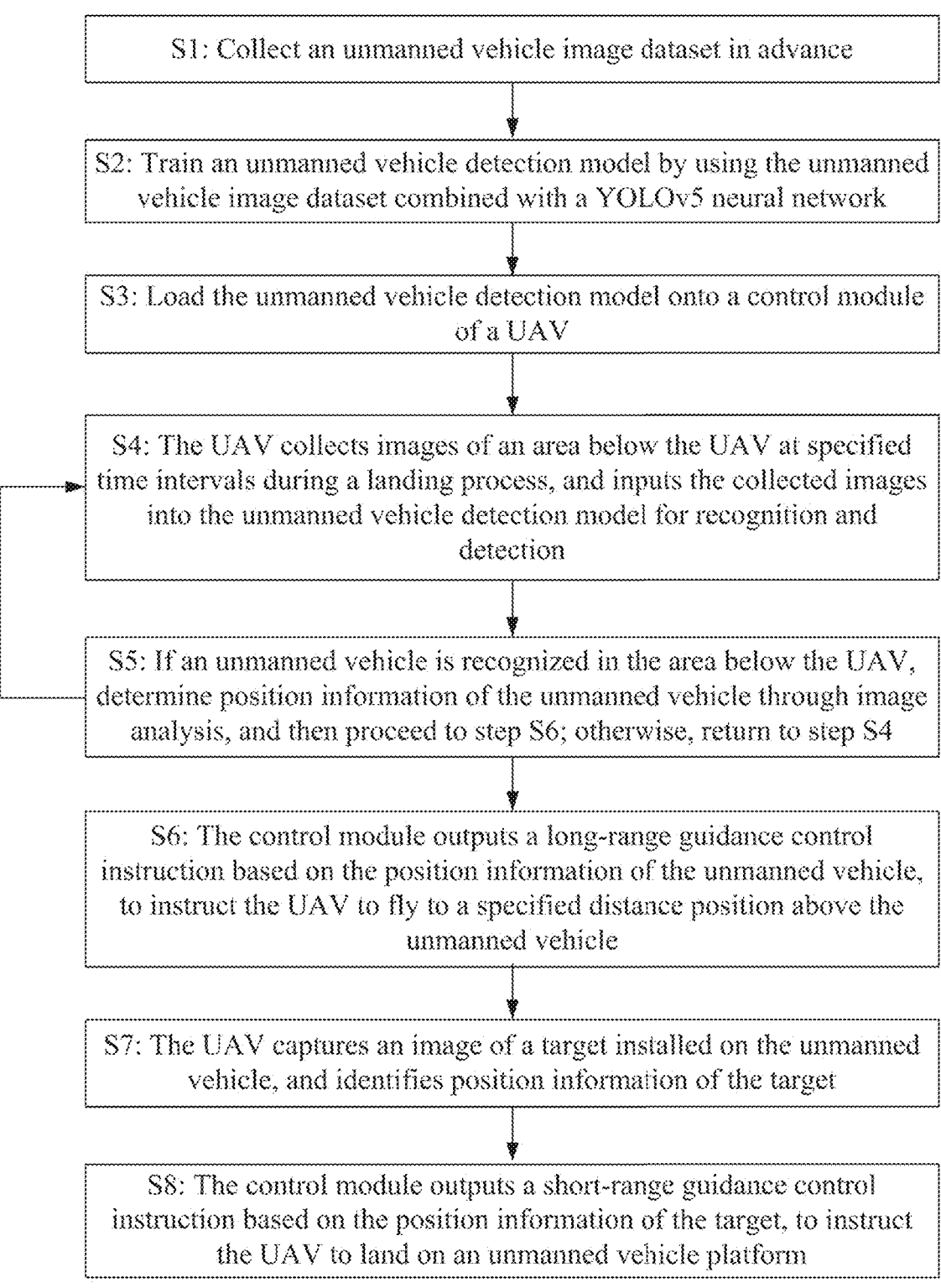
FIG. 1 is a schematic flowchart of a method according to the present disclosure.

As shown in FIG. 1, a method of vision-based long-range and short-range guidance for autonomous UAV landing includes the following steps:

S1: Collect an unmanned vehicle image dataset in advance.

S2: Train an unmanned vehicle detection model by using the unmanned vehicle image dataset combined with a YOLOv5 neural network.

S3: Load the unmanned vehicle detection model onto a control module of a UAV.

S4: The UAV collects images of an area below the UAV at specified time intervals during a landing process, and inputs the collected images into the unmanned vehicle detection model for recognition and detection.

S5: If an unmanned vehicle is recognized in the area below the UAV, determine position information of the unmanned vehicle through image analysis, and then proceed to step S6; otherwise, return to step S4.

S6: The control module outputs a long-range guidance control instruction based on the position information of the unmanned vehicle, to instruct the UAV to fly to a specified distance position above the unmanned vehicle;

S7: The UAV captures an image of a target installed on the unmanned vehicle, and identifies position information of the target.

S8: The control module outputs a short-range guidance control instruction based on the position information of the target, to instruct the UAV to land on an unmanned vehicle platform.

Figure 2:
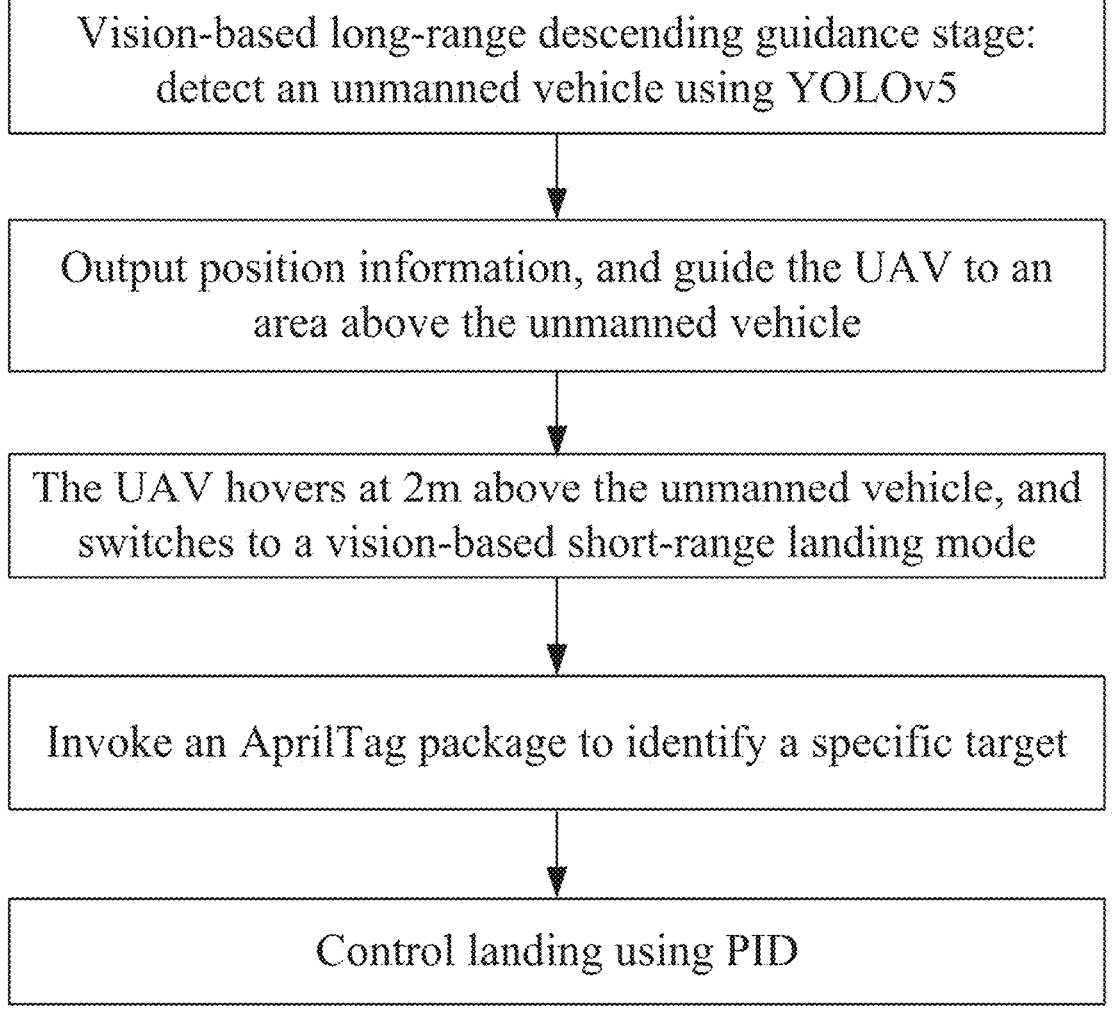
FIG. 2 is a schematic diagram showing an application process of an embodiment.
Figure 3:
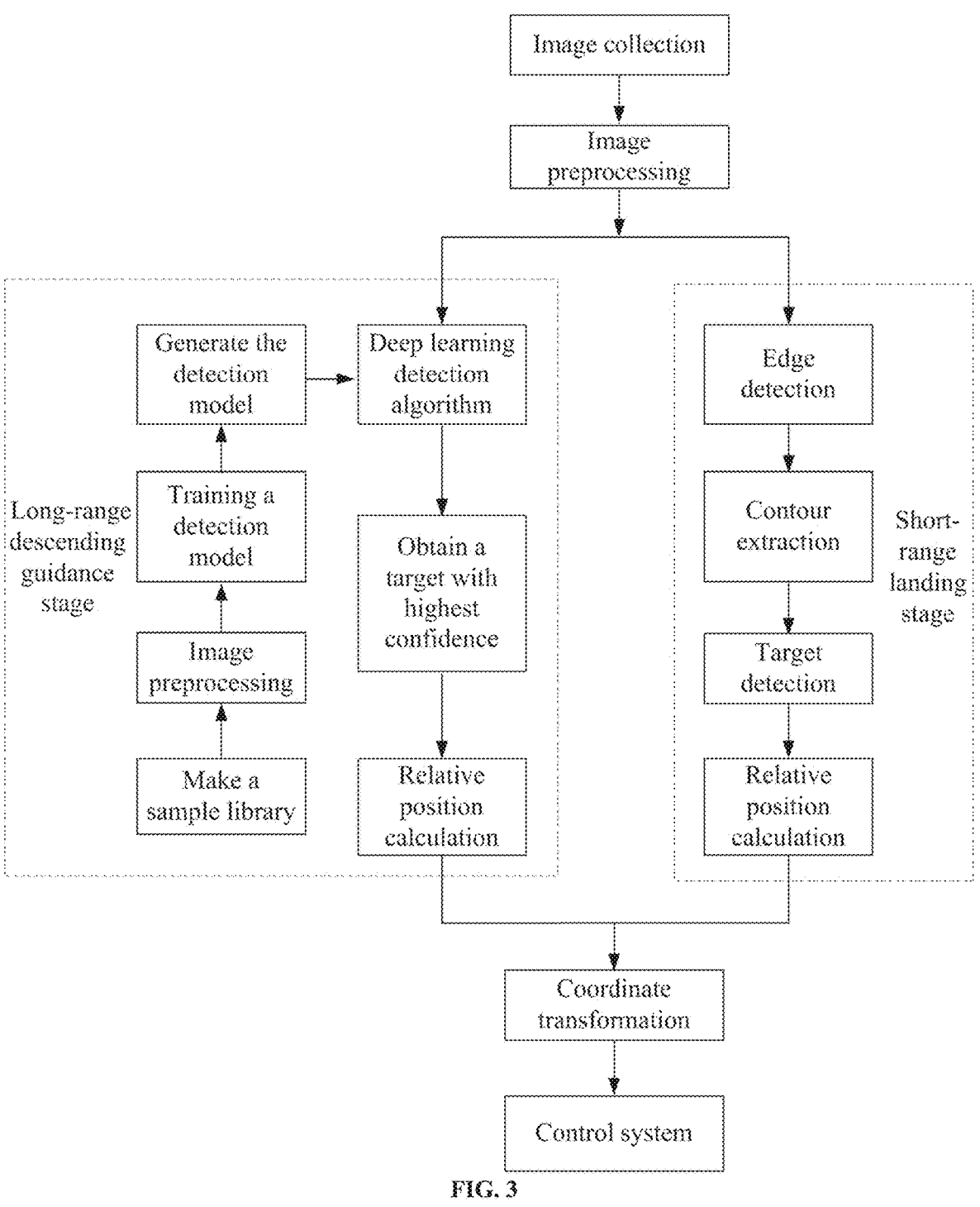
FIG. 3 is a schematic flowchart of image processing during long-range and short-range guidance in the embodiment.

In this embodiment, the above scheme is applied to guide autonomous landing of a UAV for collaborative operations with an unmanned vehicle in farmland, as shown in FIG. 2 and FIG. 3. The specific process mainly includes:

1. The UAV first captures photos of unmanned vehicle bodies in the farmland as training images. In this embodiment, the difference in the numbers of photos for different types of vehicle bodies is less than 100, and a total of approximately 2500 images related to vehicle bodies are captured.

2. The obtained images of unmanned vehicles in the farmland are preprocessed and divided into a training set and a validation set proportionally.

3. Images in the training set are annotated with labels by using an annotation tool, and categories are recorded for cluster analysis, to construct a YOLOv5 neural network.

4. The YOLOv5 neural network is trained and validated based on the training set and validation set to obtain a vehicle body identity detection model, namely, the unmanned vehicle detection model.

5. An unmanned vehicle image to be detected is inputted into the vehicle body identity detection model, and a corresponding vehicle identity detection result and a corresponding position detection result are outputted.

6. The UAV performs automatic calculation and is remotely guided, to control the UAV to fly to an area above the unmanned vehicle. The UAV hovers at a certain height (which set to 2 m in this embodiment) by rotating the direction and lowering the throttle for landing. The control module of the UAV includes a recognition unit, a processing unit, and a driving unit. An output end of the processing unit is connected to the recognition unit, and an output end of the processing unit is connected to the driving unit.

The processing unit calculates the distance between the UAV landing platform carried by the unmanned vehicle and the UAV. The driving unit is controlled according to the distance information, to drive the UAV to fly to a position above the unmanned vehicle at a height of 2 m.

The driving unit specifically adjusts the flight direction, flight altitude, flight speed, hovering, landing speed, and landing altitude of the UAV.

7. The UAV recognizes and locates the target, and when the recognition is successful, guides the UAV to descend at a short range. If the recognition fails, the UAV corrects hovering around an initial hover position and collects images until the target is successfully recognized.

8. The UAV corrects errors and aligns with the landing position by using a proportional-integral-derivative (PID) system.

In this embodiment, when constructing a sample dataset, it is necessary to classify and calibrate the sample dataset, and unifies sizes and resolutions of the images in the sample dataset. The sample dataset includes calibration data for various models of vehicle bodies. Mosaic data augmentation is employed in preprocessing, including random horizontal or vertical flipping, cropping, and scale transformation of images of vehicles in the farmland.

Figure 4:
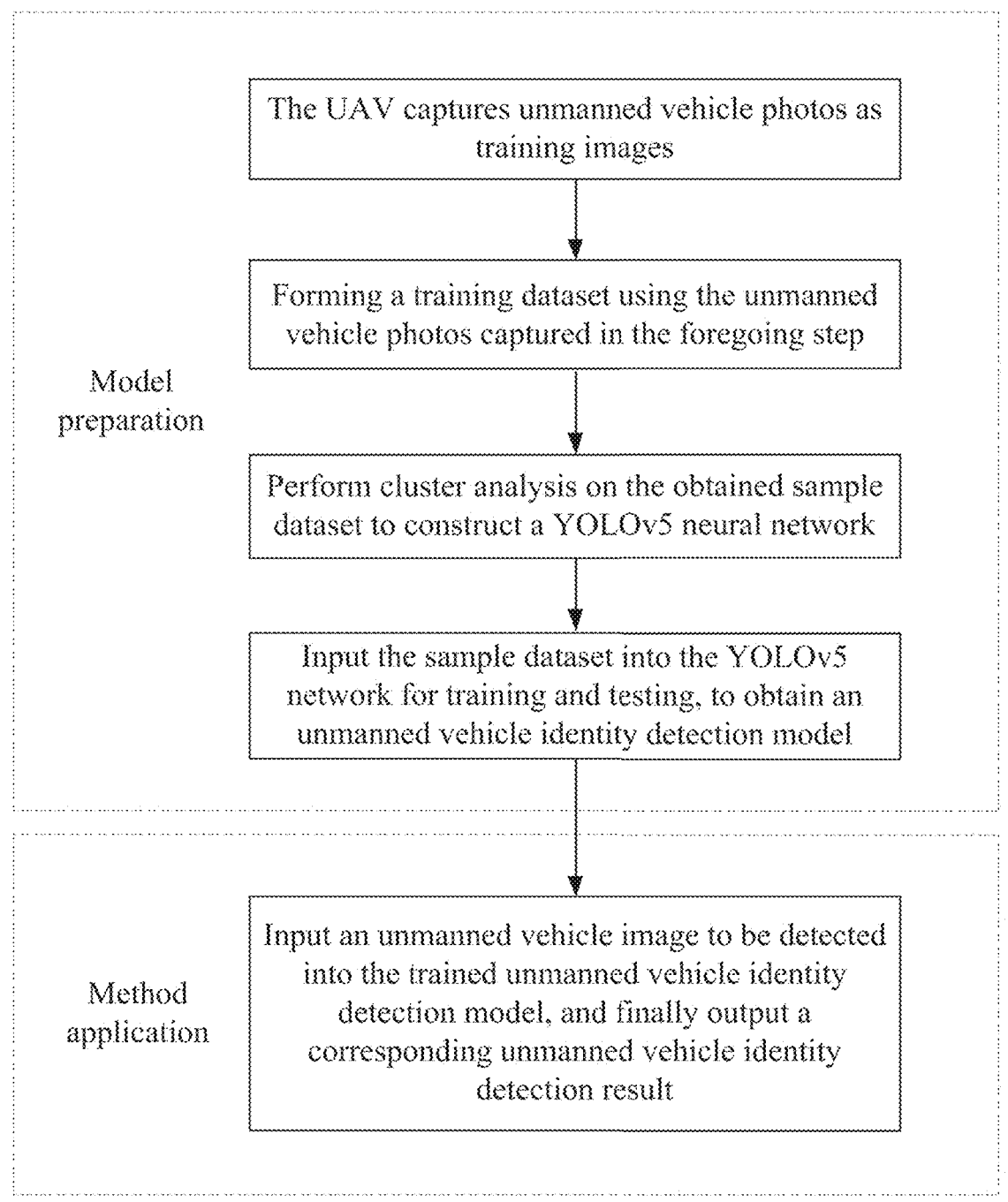
FIG. 4 is a schematic diagram of a construction process of an unmanned vehicle detection model.
Figure 5:
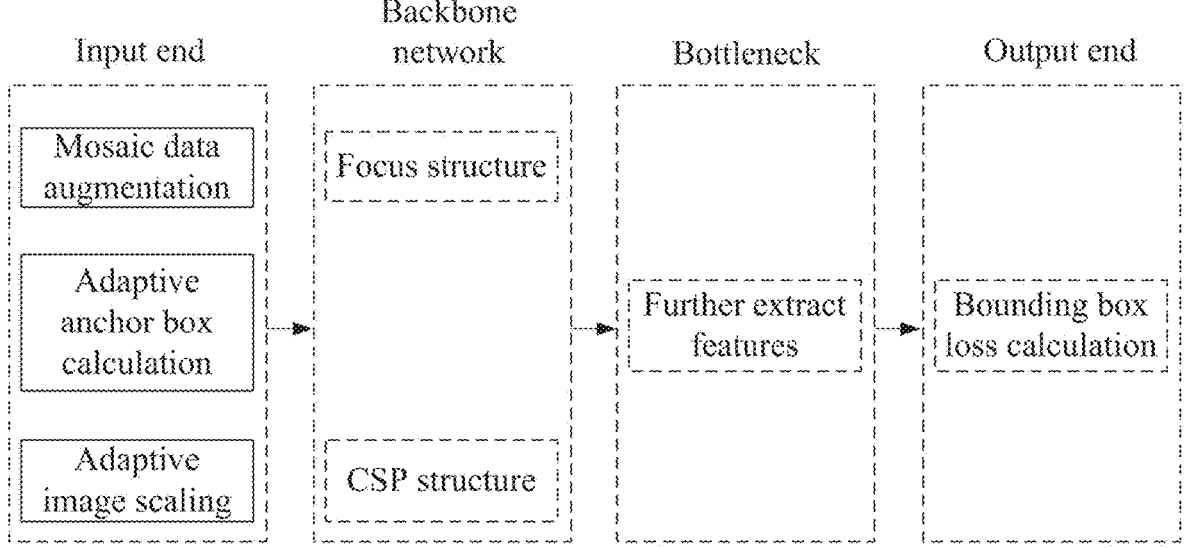
FIG. 5 is a schematic principle diagram of a YOLOv5 algorithm.

In this embodiment, as shown in FIG. 4 and FIG. 5, during the training of the YOLOv5 neural network, the final detection model is formed by identifying feature points of unmanned vehicles from the images captured by the UAV. The feature points of unmanned vehicles consist of vehicle names and vehicle bodies. The vehicle name and body shape are the main recognition criteria. YOLOv5 learns from the feature points marked in the training set and ultimately obtains the most suitable model data. After identifying the data corresponding to the above conditions, the vehicle name of the corresponding unmanned vehicle can be found.

In this embodiment, the image sizes and resolutions of the sample dataset are first unified: the images are scaled down according to the input size required by the YOLOv5 neural network, and then black bars are added to the shorter sides to form a square, thereby meeting the input specification of 608 pixels*608 pixels. In addition, the GIOU Loss is used to calculate the loss of the bounding box during the training process of the YOLOv5 neural network. The specific calculation method is as follows:

$$\text{GIoU} = |A \cap B| |A \cup B| - |C \backslash (A \cup B|| C| = \text{IoU} - |C \backslash (A \cup B|| C|$$

That is, for any two arbitrary boxes A and B, a smallest enclosed shape C is found, where C contains both A and B; then a ratio of an area of C outside A and B to a total area of C is calculated, and the ratio is subtracted from an IoU of A and B.

Figure 6:
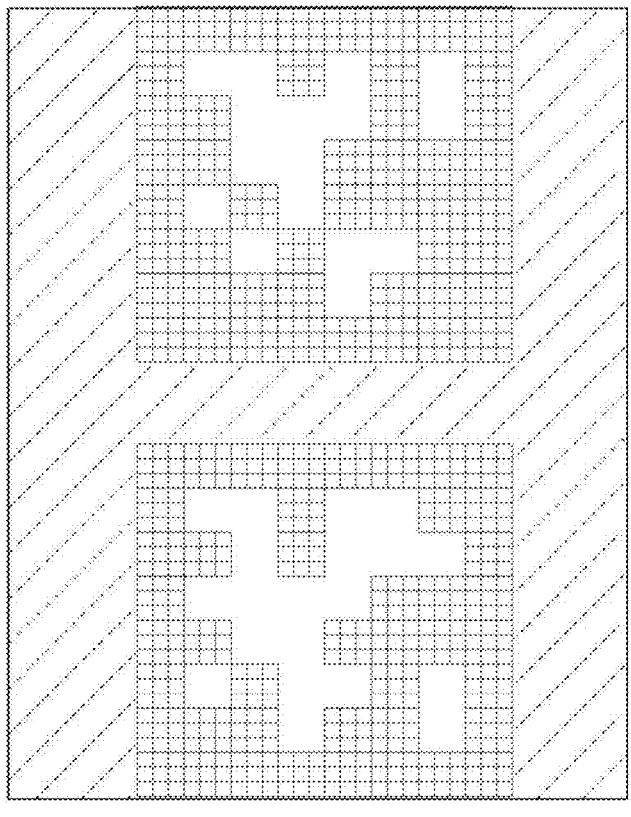
FIG. 6 is a schematic diagram of a target pattern in the embodiment.

In this embodiment, the target installed on the unmanned vehicle is shown in FIG. 6, which is configured as a physical landing target with a size of 0.5 m*0.5 m. The target pattern consists of two AprilTags and an H-shaped geometric pattern. Both AprilTags are composed of black and white, carrying various information.

Figure 7:
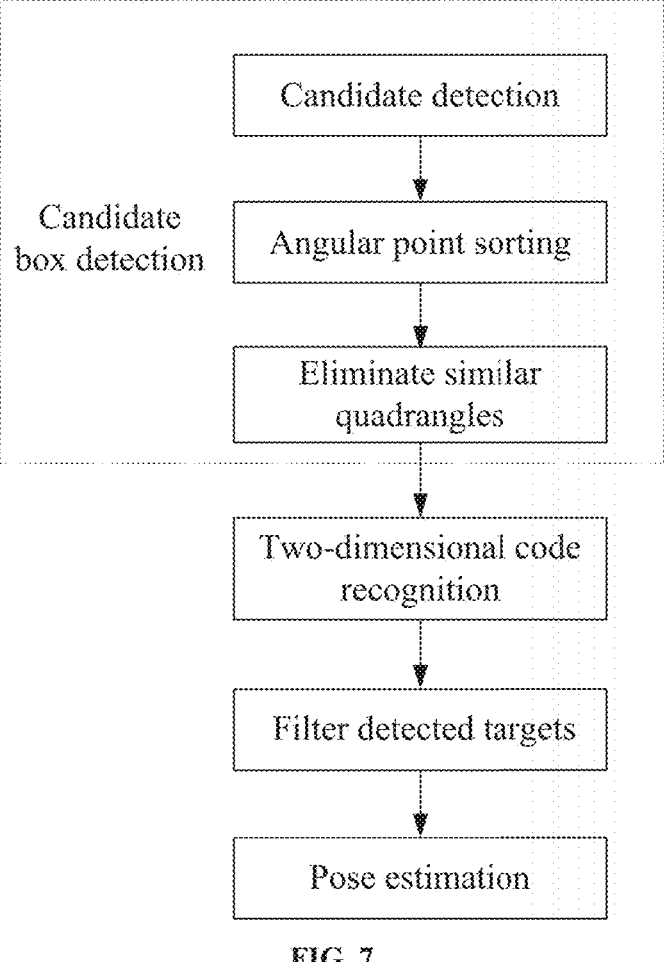
FIG. 7 is a schematic flowchart of target recognition and positioning.

As shown in FIG. 7, during short-range guidance, the target is detected using a preset AprilTag package, and the obtained serial number and position information of the obtained AprilTags in the target image are saved. The detection result and decoding result are saved to a temporary detection result set. Next, coordinate system transformation is performed on the position information of the obtained AprilTags in the image, and then Euler angles are obtained through a homography matrix to obtain real-time positions of the AprilTags, facilitating accurate and reliable directional positioning of the UAV.

In summary, this technical solution designs a method of long-range and short-range guidance for autonomous UAV landing, and proposes a new target pattern design, which can easily and efficiently achieve precise fixed-point landing of UAVs.

What is claimed is:

1. A method of vision-based long-range and short-range guidance for autonomous unmanned aerial vehicle (UAV) landing, comprising the following steps:

S1: collecting an unmanned vehicle image dataset in advance;

S2: training an unmanned vehicle detection model by using the unmanned vehicle image dataset combined with a YOLOv5 neural network;

S3: loading the unmanned vehicle detection model onto a control module of a UAV;

S4: collecting, by the UAV during a landing process, images of an area below the UAV at specified time intervals, and inputting the collected images into the unmanned vehicle detection model for recognition and detection;

S5: if an unmanned vehicle is recognized in the area below the UAV, determining position information of the unmanned vehicle through image analysis, and then proceeding to step S6; otherwise, returning to step S4;

S6: outputting, by the control module, a long-range guidance control instruction based on the position information of the unmanned vehicle, to instruct the UAV to fly to a specified distance position above the unmanned vehicle;

S7: capturing, by the UAV, an image of a target installed on the unmanned vehicle, and identifying position information of the target; and

S8: outputting, by the control module, a short-range guidance control instruction based on the position information of the target, to instruct the UAV to land on an unmanned vehicle platform;

wherein step S2 comprises the following sub-steps:

S21: preprocessing the unmanned vehicle image dataset and dividing the unmanned vehicle image dataset into a training set and a validation set according to a preset ratio;

S22: annotating images in the training set with corre- sponding labels by using an annotation tool, and recording categories for cluster analysis, to build the YOLOv5 neural network; and S23: training and validating the YOLOv5 neural network based on the training set and the validation set, to obtain the unmanned vehicle detection model, wherein in step S21, the preprocessing specifically adopts Mosaic data augmentation, comprising but not limited to random horizontal or vertical flipping, cropping, and scale transformation operations.

2. The method of vision-based long-range and short-range guidance for autonomous UAV landing according to claim 1, wherein in step S23, before the training and validation of the YOLOv5 neural network, image sizes and resolutions are standardized: first, scaling down the images based on an input size required by the YOLOv5 neural network, and then adding black bars to shorter sides to form a square, thereby meeting input specifications of 608 pixels*608 pixels.

3. The method of vision-based long-range and short-range guidance for autonomous UAV landing according to claim 1, wherein during the training of the YOLOv5 neural network in step S23, a Generalized Intersection over Union (GIOU) loss function is specifically used to calculate a loss of a bounding box:

$$GIOU = |A \cap B||A \cup B| - |C \setminus (A \cup B)||C| = IoU - |C \setminus (A \cup B)||C|$$

that is, for any two arbitrary boxes A and B, a smallest enclosed shape C is found, wherein C contains both A and B; then a ratio of an area of C outside A and B to a total area of C is calculated, and the ratio is subtracted from an Intersection over Union (IoU) of A and B to obtain a loss value of the bounding box.

4. The method of vision-based long-range and short-range guidance for autonomous UAV landing according to claim 1, wherein the target installed on the unmanned vehicle is a pattern comprising two AprilTags and an H-shaped geomet- ric pattern, with the two AprilTags located in upper and lower grooves of the H-shaped geometric pattern.

5. The method of vision-based long-range and short-range guidance for autonomous UAV landing according to claim 4, wherein the target has a size of 0.5 m*0.5 m.

6. The method of vision-based long-range and short-range guidance for autonomous UAV landing according to claim 4, wherein step S7 comprises the following sub-steps:

S71: capturing, by the UAV, an image of the target installed on the unmanned vehicle;

S72: analyzing and processing the image of the target to obtain position information of the AprilTags in the image of the target; and S73: performing coordinate system transformation on the position information of the April Tags in the image of the target, and then obtaining Euler angles through a homography matrix, to obtain real-time positions of the AprilTags.

7. The method of vision-based long-range and short-range guidance for autonomous UAV landing according to claim 1, wherein the control module of the UAV comprises a recognition unit and a processing unit; the recognition unit is equipped with the unmanned vehicle detection model;

the processing unit is configured to calculate distance information between the UAV and the unmanned vehicle or the target, and output a control signal for adjusting a flight status of the UAV.

8. The method of vision-based long-range and short-range guidance for autonomous UAV landing according to claim 7, wherein adjusting a flight status of the UAV comprises adjusting a flight direction, a flight altitude, a flight speed, hovering, a landing speed, and a landing altitude of the UAV.

9. The method of vision-based long-range and short-range guidance for autonomous UAV landing according to claim 1, wherein the control module of the UAV comprises a recog- nition unit and a processing unit; the recognition unit is equipped with the unmanned vehicle detection model;

the processing unit is configured to calculate distance information between the UAV and the unmanned vehicle or the target, and output a control signal for adjusting a flight status of the UAV.

10. The method of vision-based long-range and short- range guidance for autonomous UAV landing according to claim 1, wherein the control module of the UAV comprises a recognition unit and a processing unit; the recognition unit is equipped with the unmanned vehicle detection model;

the processing unit is configured to calculate distance information between the UAV and the unmanned vehicle or the target, and output a control signal for adjusting a flight status of the UAV.

11. The method of vision-based long-range and short- range guidance for autonomous UAV landing according to claim 2, wherein the control module of the UAV comprises a recognition unit and a processing unit; the recognition unit is equipped with the unmanned vehicle detection model;

the processing unit is configured to calculate distance information between the UAV and the unmanned vehicle or the target, and output a control signal for adjusting a flight status of the UAV.

12. The method of vision-based long-range and short- range guidance for autonomous UAV landing according to claim 3, wherein the control module of the UAV comprises a recognition unit and a processing unit; the recognition unit is equipped with the unmanned vehicle detection model;

the processing unit is configured to calculate distance information between the UAV and the unmanned vehicle or the target, and output a control signal for adjusting a flight status of the UAV.

13. The method of vision-based long-range and short- range guidance for autonomous UAV landing according to claim 4, wherein the control module of the UAV comprises a recognition unit and a processing unit; the recognition unit is equipped with the unmanned vehicle detection model;

the processing unit is configured to calculate distance information between the UAV and the unmanned vehicle or the target, and output a control signal for adjusting a flight status of the UAV.

14. The method of vision-based long-range and short- range guidance for autonomous UAV landing according to claim 5, wherein the control module of the UAV comprises a recognition unit and a processing unit; the recognition unit is equipped with the unmanned vehicle detection model;

the processing unit is configured to calculate distance information between the UAV and the unmanned vehicle or the target, and output a control signal for adjusting a flight status of the UAV.

15. The method of vision-based long-range and short- range guidance for autonomous UAV landing according to claim 6, wherein the control module of the UAV comprises a recognition unit and a processing unit; the recognition unit is equipped with the unmanned vehicle detection model;

the processing unit is configured to calculate distance information between the UAV and the unmanned vehicle or the target, and output a control signal for adjusting a flight status of the UAV.

16. The method of vision-based long-range and short-range guidance for autonomous UAV landing according to claim 9, wherein adjusting a flight status of the UAV comprises adjusting a flight direction, a flight altitude, a flight speed, hovering, a landing speed, and a landing altitude of the UAV.

17. The method of vision-based long-range and short-range guidance for autonomous UAV landing according to claim 10, wherein adjusting a flight status of the UAV comprises adjusting a flight direction, a flight altitude, a flight speed, hovering, a landing speed, and a landing altitude of the UAV.

18. The method of vision-based long-range and short-range guidance for autonomous UAV landing according to claim 11, wherein adjusting a flight status of the UAV comprises adjusting a flight direction, a flight altitude, a flight speed, hovering, a landing speed, and a landing altitude of the UAV.

\* \* \* \* \*